(12) United States Patent
Gleason et al.

(10) Patent No.: US 6,588,287 B2
(45) Date of Patent: Jul. 8, 2003

(54) MULTIPLE STAGE SYSTEM FOR AERODYNAMIC TESTING OF A VEHICLE ON A STATIC SURFACE AND RELATED METHOD

(75) Inventors: Mark E Gleason, Farmington Hills, MI (US); Gary F Romberg, Northville, MI (US)

(73) Assignee: DaimlerChrysler, Auburn Hills, MI (US)

( * ) Notice: Subject to any disclaimer, the term of this patent is extended or adjusted under 35 U.S.C. 154(b) by 0 days.

(21) Appl. No.: 10/114,192

(22) Filed: Apr. 2, 2002

(65) Prior Publication Data

US 2002/0152799 A1 Oct. 24, 2002

Related U.S. Application Data

(60) Provisional application No. 60/280,970, filed on Apr. 2, 2001.

(51) Int. Cl.[7] .................................................. G01M 9/06
(52) U.S. Cl. .............................. 73/865.6; 73/37; 73/147; 73/117.1; 73/117
(58) Field of Search .......................... 73/147, 37, 865.6, 73/117.1, 117

(56) References Cited

PUBLICATIONS

A. Filippone, "Advanced topics in aerodynamics" 1999.*
SAE, SAE 2001 World Congress, 2001.*

* cited by examiner

*Primary Examiner*—Daniel S. Larkin
*Assistant Examiner*—André K. Jackson
(74) *Attorney, Agent, or Firm*—Donald J. Wallace

(57) ABSTRACT

A system for aerodynamically testing a vehicle having a front pair of wheels and a rear pair of wheels includes a surface for statically supporting the vehicle. The system additionally includes a primary source of air directed towards the vehicle. The primary source of air aerodynamically simulates conditions for the vehicle at a predetermined speed. The system further includes a first supplemental source of air directed into a flow of air generated by the primary source of air immediately behind the first pair of wheels.

11 Claims, 1 Drawing Sheet

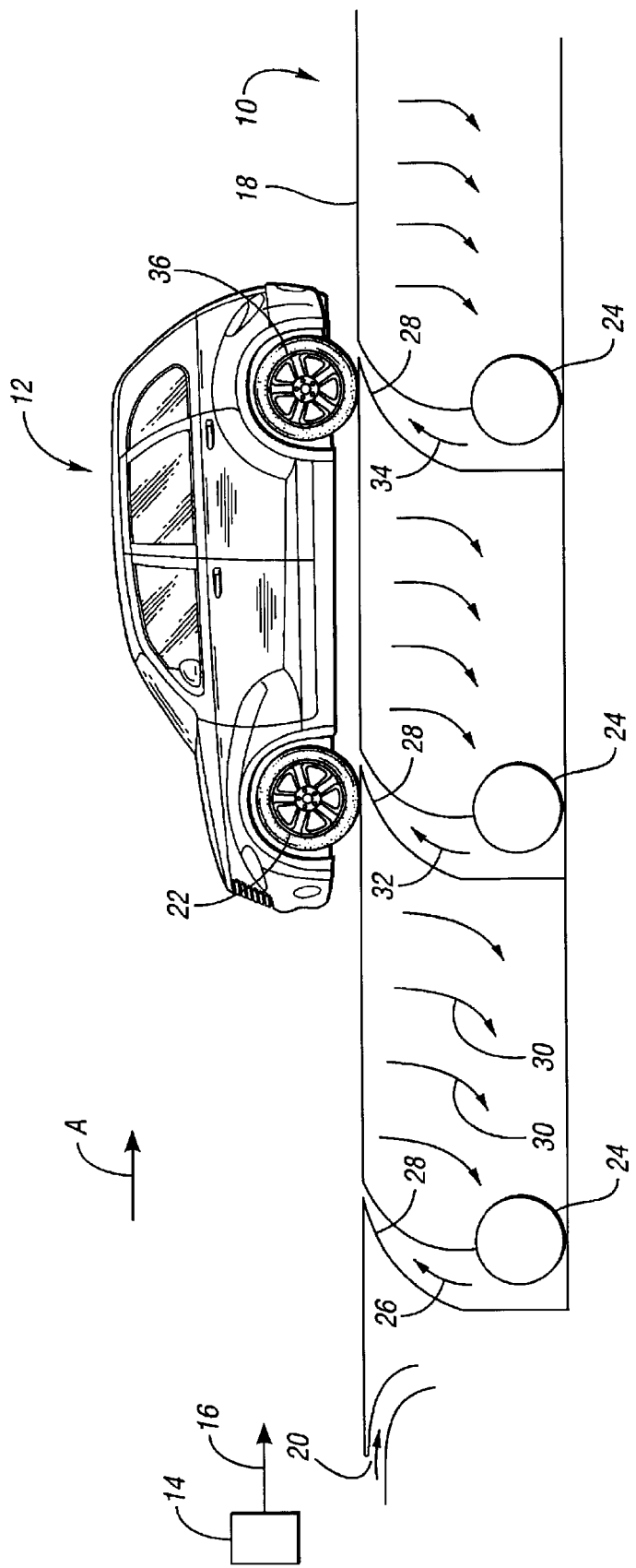

MULTIPLE STAGE SYSTEM FOR AERODYNAMIC TESTING OF A VEHICLE ON A STATIC SURFACE AND RELATED METHOD

CROSS REFERENCE TO RELATED APPLICATIONS

This application claims the benefit of U.S. Provisional Patent Application Ser. No. 60/280,970, filed on Apr. 2, 2001.

FIELD OF THE INVENTION

The present invention generally pertains to wind tunnel testing. More particularly, the present invention pertains to a wind tunnel for the aerodynamic testing of vehicles. More specifically, but without restriction to the particular embodiment and/or use which is shown and described for purposes of illustration, the present invention relates to a multiple stage system for fluid flow velocity profile control on a fixed surface.

BACKGROUND OF THE INVENTION

Modern motor vehicles are thoroughly tested during development in various extreme environments. Such testing includes wind tunnel testing during which a vehicle is subjected to an artificially created and controlled air flow.

It is a relatively straightforward matter to replicate a wind velocity experienced by a motor vehicle at a particular driving speed. However, the simulation of accurate driving conditions also requires, among other considerations, management of a boundary layer which would otherwise build up adjacent to a stationary platform supporting the vehicle. Such a boundary layer results in a slower flow of air adjacent the support surface that does not accurately simulate conditions experienced by a vehicle traveling over a road surface at the particular driving speed.

The inaccuracies attendant with boundary layer buildups have been overcome in the prior art through the incorporation of a continuous belt. The continuous belt is driven at a speed equal to the desired vehicle speed to thereby simulate relative movement between the vehicle and a road surface. Among other limitations, wind tunnel testing systems incorporating moving belts are complex, expensive, require continual maintenance, and can require significant vehicle modification prior to vehicle testing.

It is also known in the prior art to simulate relative movement between a vehicle to be tested and a stationary surface through the introduction of various mechanisms intended to either divert slower flowing air from adjacent the stationary surface or introduce a faster flow of air adjacent the stationary surface. While such arrangements overcome many of the drawbacks attended with moving belt systems, they have not been able to accurately simulate driving conditions. Explaining further, with such systems the velocity profile is often distorted as it passes along the length of the vehicle. It remains a need in the pertinent art to provide a system for aerodynamic testing of a vehicle without a moving belt which more accurately simulates driving conditions to be experienced by the vehicle at a predetermined vehicle speed.

SUMMARY OF THE INVENTION

In accordance with one aspect of the present invention, a method and apparatus are provided for more accurately simulating the aerodynamics of a moving road beneath a vehicle being tested in a wind tunnel without the need of a moving belt.

In accordance with another object of the present invention, a method and apparatus are provided for aerodynamic testing of a vehicle which establishes a reduced boundary layer formed under the vehicle under testing in the wind tunnel without distorting or overshooting a velocity profile.

Yet another aspect of the present invention is to provide a method and apparatus for testing a motor vehicle in a wind tunnel which does not require modification of the vehicle for mounting over a moving belt.

In one form, the present invention provides a method of aerodynamic testing a vehicle having a front pair of wheels and a rear pair of wheels. The method includes statically supporting the vehicle on a surface, and directing a primary source of air along the fixed surface towards the vehicle. The primary source of air simulates the aerodynamic conditions for the vehicle at a predetermined speed. A first supplemental source of air is introduced into a flow of air generated by the primary source of air along and parallel to the fixed surface immediately behind the first pair of wheels of the vehicle.

In another form, the present invention provides a system for aerodynamically testing a vehicle having a front pair of wheels and a rear pair of wheels. The system includes a surface for statically supporting the vehicle. The system additionally includes a primary source of air directed towards the vehicle. The primary source of air aerodynamically simulates conditions for the vehicle at a predetermined speed. The system further includes a first supplemental source of air directed into a flow of air generated by the primary source of air immediately behind the first pair of wheels.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

The present invention will become more fully understood from the detailed description and the accompanying drawings, wherein:

The FIGURE is a simplified view of a system for aerodynamic testing of a vehicle statically supported on a surface constructed in accordance with the teachings of a preferred embodiment of the present invention, the system shown operatively associated with an exemplary motor vehicle.

DETAILED DESCRIPTION OF THE PREFERRED EMBODIMENTS

With reference to the FIGURE, a simplified view of a system for aerodynamic testing of a vehicle statically supported on a surface constructed in accordance with the teachings of a preferred embodiment of the present invention is illustrated and general identified at reference number 10. As used herein, the term "statically supported" is intended to differentiate support of a vehicle on a continuous belt. It is contemplated within the scope of the present invention that in certain applications it may be desirable to "statically support" the vehicle on a rotating panel or turntable. The system 10 is shown operatively associated with a motor vehicle 12. Those skilled in the art will appreciate that the vehicle illustrated is merely exemplary and that the teachings of the present invention are applicable to virtually any vehicle.

The system 10 is illustrated to generally include a primary wind generating system 14 for creating a primary source of air 16. The primary wind generating system 14 will be understood to be conventional in construction. As such, the primary wind generating system 14 need not be addressed in detail. The primary wind generating system 14 serves to direct the primary source of air 16 generally in the direction of arrow A.

The system 10 of the present invention is further generally shown to include a surface 18 for statically supporting the vehicle 12 and a forwardly facing scoop 20 which functions to reduce boundary layer build up adjacent the surface 18. In one application, the forwardly facing scoop 20 operates passively. That is, the forwardly facing scoop 20 is not connected to a blower or vacuum source for drawing off or diverting a portion of the primary air flow 16 below the surface 18. Alternatively, in certain applications it may be desirable to incorporate a blower or a vacuum source (not shown). In one specific application, the forward facing scoop 20 is located approximately 14 feet forward of a front pair of wheels 22 of the vehicle 12.

The system 10 of the present invention is illustrated to further include one or more impellers or blowers 24 for introducing a supplemental source of air into the flow of air generated by the primary source of air 16. In the embodiment illustrated, the system of the present invention is shown to include three (3) such blowers 24. A first of the blowers 24 introduces a first supplemental source of air 26 through a tangentially directed blowing slot 28 at a position forward of the vehicle 12. In one specific application, the exit of the tangentially directed blowing slot 28 is positioned approximately 10 to 12 feet forward of the front pair of wheels 22. The first supplemental source of air 26 is blown substantially at the speed of the free stream of the primary source of air 16 and further reduces any significant boundary layer built up adjacent the surface 18. Preferably, the first blower 24 draws a source of intake air 30 through perforations provided in the surface 18. This additional withdrawal of air from adjacent the surface 18 even further reduces the built up of boundary layer adjacent surface 18.

The second and third blowers 24 of the system 10 are illustrated in the drawings to produce second and third supplemental sources of air 32 and 34, respectively. Similar to the first blower 24, the second and third blowers 24 are associated with tangentially blowing slots 28 for introducing the supplemental sources of air 32, 34 into the primary source of air 16 at substantially the initial speed of the primary source of air 16. The second supplemental source of air 32 is illustrated being introduced tangentially at a position substantially immediately behind the front pair of wheels 22 of the vehicle 12. Similarly, the third supplemental source of air 34 is illustrated being introduced tangentially at a position substantially immediately behind a rear pair of wheels 36 of the vehicle 12. The second and third supplemental sources of air 32 and 34 function to reintroduce the momentum of the ground into the area directly behind the front and rear pair of wheels 22 and 36, respectively.

In the preferred embodiment, the system 10 is modularly constructed. In this manner, the system 10 permits a distance between the blowing slots 28 associated with the second and third supplemental sources of air 32 and 34 to be adjusted. In this manner, the system 10 can readily accommodate vehicles having different wheel bases.

While the invention has been described in the specification and illustrated in the drawings with reference to a preferred embodiment, it will be understood by those skilled in the art that various changes may be made and equivalents may be substituted for elements thereof without departing from the scope of the invention as fined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention.

What is claimed is:

1. A method of aerodynamic testing a vehicle having a front pair of wheels and a rear pair of wheels, the method comprising the steps of:

statically supporting the vehicle on a surface;

directing a primary source of air toward the vehicle, the primary source of air stimulating aerodynamic conditions for the vehicle at a predetermined speed; and introducing a first supplemental source of air into a flow of air generated by the primary source of air immediately behind the front pair of wheels.

2. The method of claim 1, further comprising the step of introducing a second supplemental source of air into the flow of air generated by the primary source of air immediately behind the rear pair of wheels.

3. The method of claim 1, wherein a portion of the flow of air generated by the primary source of air adjacent the surface travels at a reduced speed and wherein the step of introducing a first supplemental source of air includes the steps of drawing the portion of air into a blower and introducing the first supplemental source of air with the blower.

4. The method of claim 1, wherein a portion of the flow of air generated by the primary source of air adjacent the surface travels at a reduced speed and further comprising the step of diverting the portion below the surface.

5. A system for aerodynamic testing a vehicle having a front pair of wheels and a rear pair of wheels, the system comprising:

a surface for statically supporting the vehicle;

a primary source of air directed toward the vehicle, the primary source of air simulating aerodynamic conditions for the vehicle at a predetermined speed; and a first supplemental source of air directed into a flow of air generated by the primary source of air immediately behind the front pair of wheels.

6. The system of claim 5, further comprising a second supplemental source of air directed into the flow of air generated by the primary source of air immediately behind the rear pair of wheels.

7. The system of claim 6, wherein the surface includes a plurality of perforations for diverting a portion of the flow of air generated by the primary source of air through the surface and introducing the second supplemental source of air with a blower.

8. The system of claim 5, wherein a portion of the flow of air generated by the primary source of air adjacent the surface travels at a reduced speed and further comprising a forwardly facing scoop for diverting the portion below the surface.

9. The system of claim 6, wherein the first and second supplemental sources of air are introduced into the flow of air generated by the primary source of air through first and second blowing slots, respectively.

10. The system of claim 5, wherein the surface includes a plurality of perforations for passage of the portion of the flow of air through the surface and into one of the first and second supplemental sources of air.

11. The system of claim 10, further comprising a blower for generating one of the first and second supplemental sources of air.

* * * * *

UNITED STATES PATENT AND TRADEMARK OFFICE
CERTIFICATE OF CORRECTION

PATENT NO. : 6,588,287 B2
DATED : July 8, 2003
INVENTOR(S) : Gleason et al.

It is certified that error appears in the above-identified patent and that said Letters Patent is hereby corrected as shown below:

<u>Title page,</u>
Item [73], Assignee, after "DaimlerChrysler" insert -- Corporation --.

Signed and Sealed this

Fourth Day of November, 2003

JAMES E. ROGAN
*Director of the United States Patent and Trademark Office*